United States Patent [19]
Tavs et al.

[11] Patent Number: 6,073,175
[45] Date of Patent: Jun. 6, 2000

[54] METHOD FOR SUPPORTING DIFFERENT SERVICE LEVELS IN A NETWORK USING WEB PAGE CONTENT INFORMATION

[75] Inventors: John Edward Tavs, Cary, N.C.; Dinesh Chandra Verma, Millwood, N.Y.

[73] Assignee: International Business Machines Corporation, Armonk, N.Y.

[21] Appl. No.: 09/067,509

[22] Filed: Apr. 27, 1998

[51] Int. Cl.[7] ............................................. G06F 13/00
[52] U.S. Cl. ............................... 709/226; 709/240
[58] Field of Search .................................. 709/226, 240, 709/229, 203, 219

[56] References Cited

U.S. PATENT DOCUMENTS

| | | | |
|---|---|---|---|
| 5,408,655 | 4/1995 | Oren et al. | 395/600 |
| 5,678,041 | 10/1997 | Baker et al. | 395/609 |
| 5,796,952 | 8/1998 | Davis et al. | 709/224 |
| 5,826,031 | 10/1998 | Nielsen | 709/233 |
| 5,848,407 | 12/1998 | Ishikawa et al. | 707/2 |

OTHER PUBLICATIONS

Top 10 approach to prefetching on the Web, Markatos et al., ICS publication, pp. 1–15, Aug. 1996.

*Primary Examiner*—Zarni Maung
*Attorney, Agent, or Firm*—Whitham, Curtis & Whitham

[57] ABSTRACT

A method for classifying different pages accessed by a web-browser into different service-levels on a granularity finer than that of the connection. The method augments each edge device with two applications, a Client-Proxy and a Server-Proxy. The Client-Proxy obtains identifying information from the client's request, and the obtain PICS labelling information from a label referee. This information is used to obtain a service level from an LDAP based SLA directory, and this service level information is then imbedded along with a unique identifier for the network operator organization in the HTTP header request which is transferred to the Server-Proxy. The Server-Proxy then strips the header containing the PICS information from the request and forwards the request to the server. When the Server-Proxy gets a response, it uses the PICS information to mark the packets.

16 Claims, 3 Drawing Sheets

METHOD FOR SUPPORTING DIFFERENT SERVICE LEVELS IN A NETWORK USING WEB PAGE CONTENT INFORMATION

BACKGROUND OF THE INVENTION

1. Field of the Invention

The present invention generally relates to service level agreements on a corporate intranet or an internet service provider network, and more particularly to methods for differentiating service levels.

2. Background Description

As corporate networks evolve, they tend to get congested as usage exceeds the original points of design. In such an environment, it is desirable to give priority or preference to traffic that is deemed more relevant to the business of the corporation than to network traffic which is less relevant to the business needs.

The classification of network traffic into different categories can be done at various granularities. The granularity of classification depends upon the information available to the agent system doing the classification. Networks follow a layered architecture, and the information available to an agent depends on the layer at which the agent operates. An agent which is required to operate by looking at the contents of individual packets (i.e. operating at layer III of the OSI protocol), can only base its classification on the information in fields of the packet, such as source/destination machine addresses or source/destination port numbers. An agent which is not able to combine information across multiple packets will only be able to distinguish among traffic belonging to different sessions, with each session being identified by its end-point (host address and port).

Often times, one would have to carry multiple classes of traffic on the same session. This is the case when using a product like the IBM WebRedirector. The WebRedirector enables a web-client to access multiple applications via a single front-end server. The session between the web-client and the front-end server carries a variety of traffic. Similarly, the reuse of open connections as mandated by the HTTP Version 1.1 protocol can lead to the transport of different classes of data on the same session between a client and a web server.

When business needs can be defined over the granularity of one connection, a scheme described in co-pending application for ARCHITECTURE FOR SUPPORTING SERVICE LEVEL AGREEMENTS IN AN IP NETWORK can be used for this purpose. However, there is a problem associated with using the connection-level granularity for defining business-relevance due to the specific nature of the most prevalent method used to access the network, viz. through a web browser. Some situations where connection-level granularity does not work are:

A corporation has the same web-server provide different types of documents, some which are relevant to business needs, and others which are placed there for employee entertainment and amusement. A web-browser using HTTP Version 1.1 is very likely to use the same connection for accessing both of these pages.

A corporation is using a web-redirector, in which all requests are handled initially by a single server. The server then redirects all requests over to the appropriate server. Even though each request ends up creating different connections to the eventual server, there is a single connection from the browser to the web-redirector. Even if the browser and the web-redirector establish different connections for each request, their source and destination points are identical, and it is not possible to prioritize among them.

It is known in the prior art that web-pages can be rated on the basis of their contents using a rating scheme such as provided for in PICS (Platform for Internet Content Selection; see http://www.w3.org/PICS). PICS provides an infrastructure for associating labels with Internet content, thereby enabling a marketplace for web page rating services. This infrastructure provides "label bureau" sites where ratings of web pages ("content label") can be stored and queried.

PICS enables the classification of web-page contents into categories. It was originally designed to help parents and teachers control what children access over the Internet, using such categories as "G", "PG-13" or "NC-17". However, the PICS infrastructure can be used for other purposes. For example, a classification scheme can be devised to characterize web-sites as being relevant to the business to one degree or another, as being money-making to one degree or another, etc., thereby empowering the operator of an enterprise network to document and imbed in the network informed decisions concerning the importance of online content.

However, such a rating needs to be static, since dynamic changes to a large number of web-pages is difficult to administer.

At the same time, many enterprise CIOs would like to use dynamic policies to access web-sites. A web-site may be ranked as being the highest priority during normal business hours to support web-based transactions, but may be given lower priority after-hours to bulk traffic balancing the enterprise databases.

SUMMARY OF THE INVENTION

It is therefore an object of the present invention to define an architecture for support of service-differentiation in an environment where differentiation is to be based on the contents of the messages, rather than on the source and destination points of a connection.

It is a further object of the invention to differentiate among service levels provided to the same application, e.g. a web browser.

It is also an object of the invention to provide a basis and a mechanism for prioritizing between packets having the same source and destination points.

Another object of the invention is to combine a static classification scheme (such as PICS) with a dynamic set of policy rules to determine the appropriate category of traffic at a particular time.

The present invention builds upon co-pending application Ser. No. 09/056,526 for ARCHITECTURE FOR SUPPORTING SERVICE LEVEL AGREEMENTS IN AN IP NETWORK, whose disclosure is hereby incorporated by reference.

The present invention describes a method that can classify the access to different pages made by a web-browser into different service-levels on a granularity finer than that of the connection. The method is based on the placement of a proxy functionality between a web-client and the web-server. The proxy intercepts messages between the client and the server, and performs the following steps (shown in FIG. 2):

determine the static rating (e.g. using the PICS infrastructure) of the page being accessed (21);

translate the static rating into a category (23) by looking up policy rules which vary over time (22);

request the network and/or the web-server to treat the session differently according to the category (24).

The proxy functionality can be placed into a single proxy between the server and the client, or two proxies, one on the side of the client and other on the side of the server. With a single proxy architecture, the requests from the client may not receive the desired category of service as they flow from the client to the server. This may be acceptable in those cases where web-based requests are typically smaller than the replies. But in many cases the requests need to be given the desired category of service, and this can be achieved by using a two proxy architecture.

The method augments each edge device (edge devices being described in the co-pending application for ARCHITECTURE FOR SUPPORTING SERVICE LEVEL AGREEMENTS IN AN IP NETWORK) with one or two applications, either a Server-Proxy in a single proxy architecture or a Client-Proxy and a Server-Proxy in a dual proxy architecture. In the dual proxy architecture, the Client-Proxy obtains identifying information from the client's request, and then obtains PICS labelling information from a label referee. This information is used to obtain a service level from an LDAP based SLA directory, and this service level information is then imbedded along with a unique identifier for the network operator organization in the HTTP header request which is transferred to the Server-Proxy. The Server-Proxy then strips the header containing the PICS information from the request and forwards the request to the server for handling. When the Server-Proxy gets a response, it translates the PICS rating into a traffic category. This is done with policy rules. These policy rules can be configured at the proxy, or can be dynamically looked up from a directory server which stores policy information. The policy information maps a set of business ratings into a specific category.

In a preferred implementation of the invention, the content of web pages is used in the following manner to differentiate priority of access to an internet web server, in a network having edge devices which connect the network to customer devices. Business ratings of web pages are stored at a label bureau node. On receipt of a URL of a requested web page, an intermediate node at the web server determines its business rating (e.g. by lookup of the URL at the label bureau node or at a LDAP directory or the rating is found in the header of the web page). Then, at the intermediate node, the business rating is converted to a service class by looking up the rating at a directory node. By use of the intermediate node, the queuing priority of the web page service request is selected according to the service class.

In another aspect of the invention, an intermediate node at the client side (i.e. browser) looks up the rating (e.g. at a label bureau) and sends it to the web-server-side intermediate node, which converts the rating to a service class (e.g. by lookup at a directory node) and then uses the service class to set a queuing priority for the web page service request.

In a further aspect of the invention, the two intermediate nodes monitor the network traffic between them, and the client/browser side intermediate node decides when to activate the queuing priority determination mechanism.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
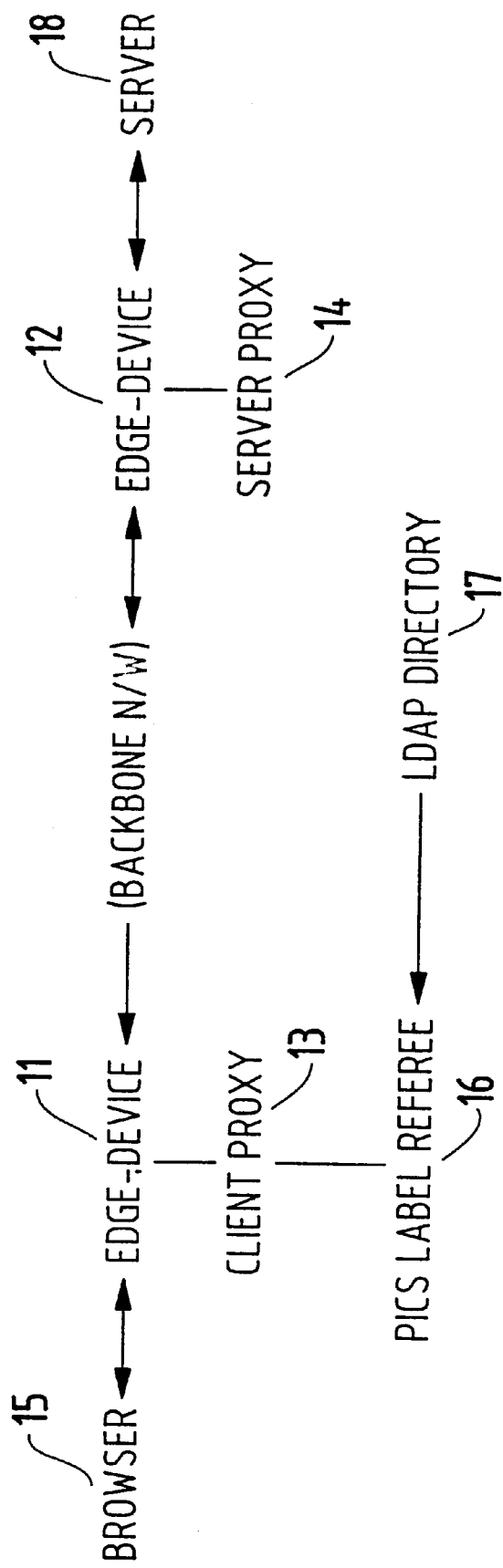
FIG. 1 is a block diagram of an architecture for support of service differentiation in accordance with the invention.

Referring now to the drawings, and more particularly to FIG. 1, there is shown an architecture in accordance with the invention for supporting service-level agreements in the context of web-servers.

The edge-device 11 is as per the architecture defined in the co-pending application for ARCHITECTURE FOR SUPPORTING SERVICE LEVEL AGREEMENTS IN AN IP NETWORK. Each edge-device 11 is augmented by two applications, which act as a proxy for the applications in the subnet behind the edge-device. One of the applications (the Client-Proxy) serves as a proxy for the clients in the subnet (i.e. the clients which initiate the request) and the other application (the Server-Proxy) serves as a proxy for the server in the subnet (i.e. the server which receives the request). The two applications would typically listen on different ports, but their function can be combined into a single process listening on a single port.

Browsers in the subnet behind need to point to the Client-Proxy in order to get any class of service better than the default or the classes defined on a connection-level granularity. One can also design a transparent proxy, in which case the application would pick up the browser requests automatically as packets traverse the edge-device, without requiring explicit configuration of the browser.

The Client-Proxy obtains information identifying the client's source and destination resources from the client's request. Examples of such information would be Source IP address, Requesting User or group of users, the URL being accessed, and the type of applications the source is willing to accept.

The Client-Proxy then queries a PICS Label Referee to obtain PICS labeling information. The labeling information acts as a front-end to the Lightweight Delivery Access Protocol (LDAP) based Service Level Agreements (SLA) directory (as defined in the co-pending application ARCHITECTURE FOR SUPPORTING SERVICE LEVEL AGREEMENTS IN AN IP NETWORK), which would return the right service-level to the Client-Proxy. The LDAP-based directory will also return the address of the Server-Proxy for the specified URL.

The Client-Proxy would then embed the service-level information in the HTTP header request, and transfer it to the Server-Proxy. The Server-Proxy strips this extra header from the request and forwards it to the server. When the Server-Proxy gets the response, it uses the PICS information to mark the packets appropriately.

In order for the Server-Proxy to not get confused with multiple PICS-SLA header in the same request, the Client-Proxy must embed a unique identifier for the network operator organization in addition to the service-level.

The step of determining the PICS rating can be done in one of the following three manners:

1) On receiving a request for a page, the proxy accesses a label-bureau in order to get the ratings for the specific page.

2) On receiving a request for a page, the proxy simply forwards the request to the server. The server sends the page back to the proxy with the PICS rating included as part of the page contents.

3) On receiving a request for a page, the proxy forwards the request to the server. On receiving the response from the server, the proxy checks for the presence of the PICS rating in the response. If no such rating is found, the proxy contacts the label-bureau to obtain the PICS rating.

The translation of PICS rating into a traffic category is done with policy rules. These policy rules can be configured at the proxy, or can be dynamically looked up from a directory server which stores policy information. The policy information maps a set of business ratings into a specific service level category.

After determining the category the proxy can do one or more of the following functions:

1) If the request has not been serviced by the server, the proxy can include category information as an additional argument to the server, either as an extra field in the HTTP header or as an additional parameter in the call to the server.

2) The proxy restricts network access to a limited bandwidth, depending on the category of the traffic.

3) The proxy changes packets belonging to the session, so that they are marked with a different Type of Service (TOS) byte or are otherwise encoded in a manner which causes the network to treat them differently.

4) The proxy can place packets belonging to the session on reserved channels in the network. A reserved channel in the network can be established using a reservation protocol like RSVP, or it can be established using alternate bandwidth allocation techniques available in the routers. The proxy can change the format of packets belonging to the session so that they would belong to a pre-existing reserved channel, or may request a new reserved channel for the session. The selection of the reserved channel is done on the basis of the service level category.

The proxy functionality can be placed at one point between the server and the client or at two points between the server and the client. It is assumed that the network between the two proxies is the one on which the differential service is desired. In the case of a single proxy, it is placed in front of the server.

Figure 2:
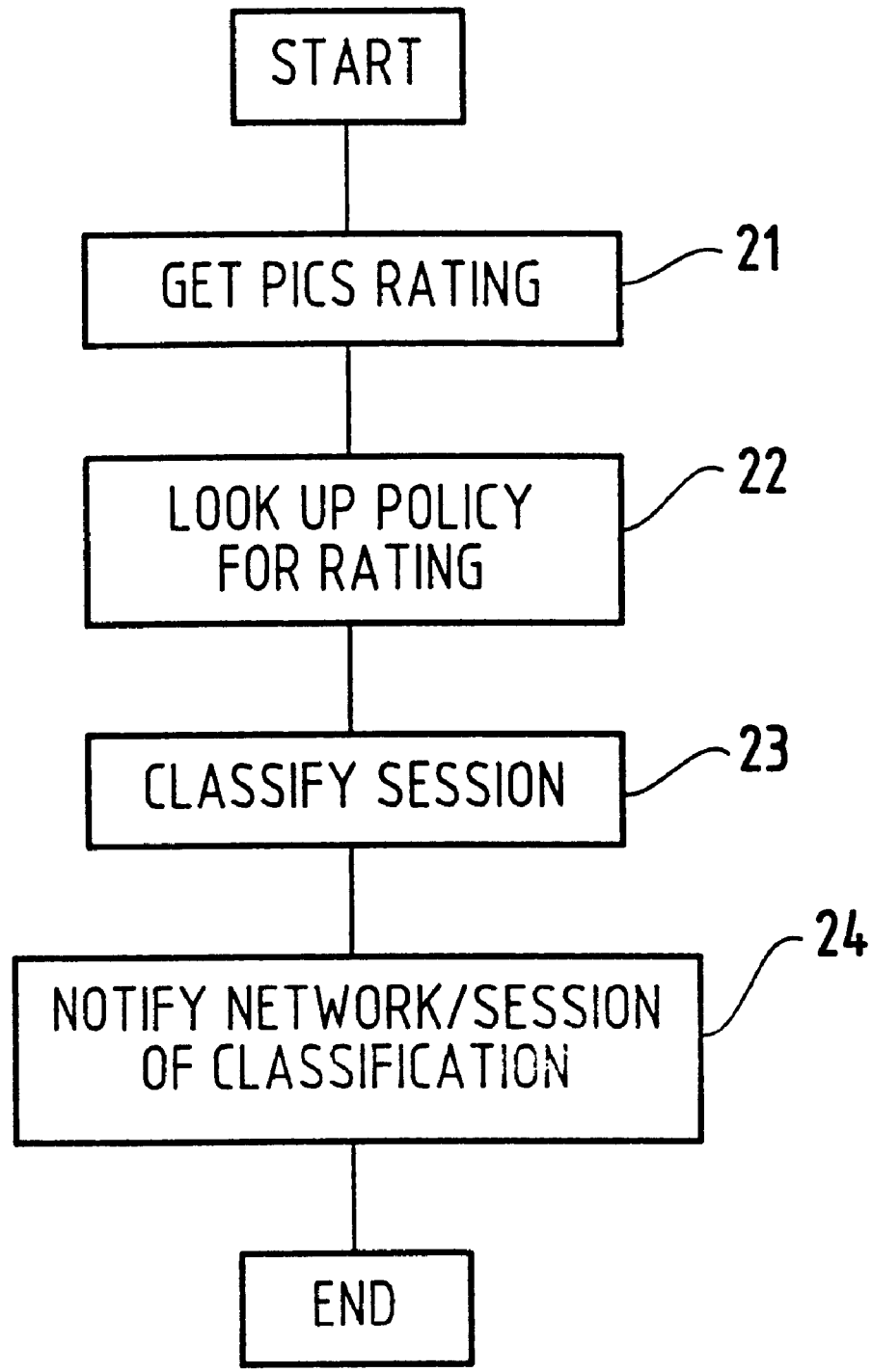
FIG. 2 is a block diagram of steps taken by a proxy in accordance with the invention.

The successive functions shown in FIG. 2 of determining a rating (21) and then determining a service level category (22 and 23) can be performed, as described above, at several points (Client-Proxy, Server-Proxy, and Server) in processing packets through the network. It is important to point out that later points in processing can perform these functions again, thereby overriding determinations made earlier. For example, if a Client-Proxy determines both rating and service level category for a request, a Server-Proxy receiving the request from the Client-Proxy (or the Server receiving the request from the Server-Proxy) may downgrade or upgrade the service level category based upon information about the Client or about traffic history from the Client.

Figure 3:
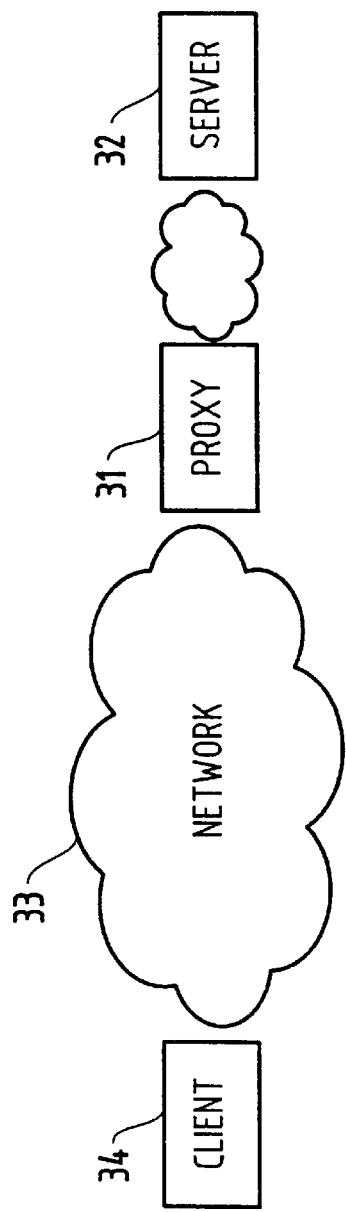
FIG. 3 is a block diagram of elements between client and server, showing a single proxy on the server side in accordance with one implementation of the invention.

Turning now to FIG. 3, there is shown a single proxy 31 on the side of the server 32. A request from the client 34 for a particular web page passes through the network 33 and is received by the proxy 31. At this point the proxy 31 may look up the rating for the requested page from a label-bureau and pass the category information to the server to process the request. Alternatively, proxy 31 may pass the request to the server and, upon receiving the reply, determine the rating either by a lookup from the label-bureau or from inspection of the contents of the web page. In either case the proxy 31 encodes the reply from the server so that it receives differential services on the network 33.

Figure 4:
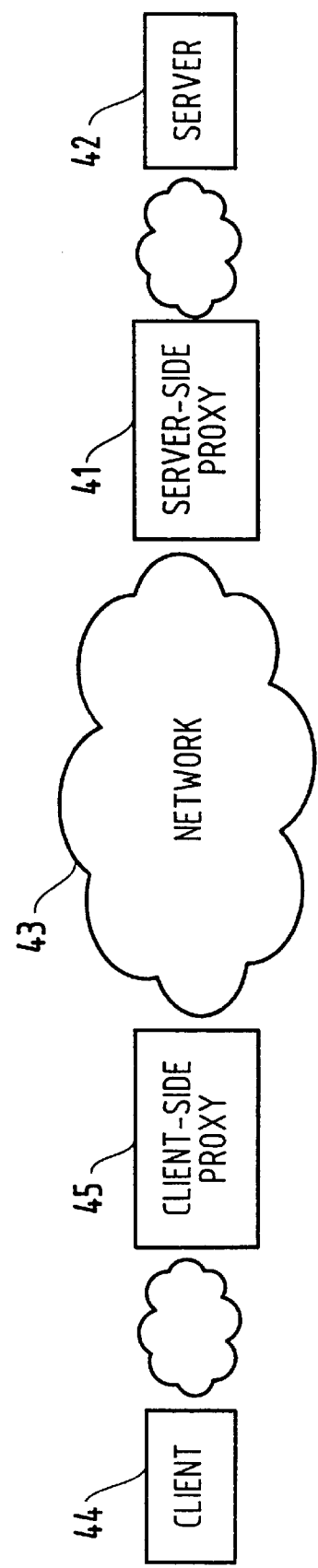
FIG. 4 is a block diagram of elements between client and server, showing two proxies in accordance with another implementation of the invention.

It should be noted that with a single proxy architecture as shown in FIG. 3, the requests from the client 34 may not receive the desired category of service from the network 33. In some cases this may be adequate since web-based requests are typically smaller than the replies. However, in many cases network efficiency will be improved if the request is given the same priority as the reply. This can be achieved with the two proxy architecture shown in FIG. 4. The Client-Proxy 45 receives from the Client 44 a request for a particular web page. Then, in accordance with the steps shown in FIG. 2, it contacts a label-bureau to obtain the PICS rating 21; contacts a directory server to determine the policy 22 for mapping the rating label into a category 23; and encodes 24 requests from the Client 44 to the Server 42 so that the Network 43 treats different categories differently. The Client-Proxy 45 forwards the request to the Server-Proxy 41. The Client-Proxy 45 may optionally include PICS rating information and the category information along with the request being passed to the Server-Proxy 41. The Server-Proxy 41 determines the PICS rating from the request (or using one of the schemes mentioned above), and translates the rating into its own category. The reply from the Server 41 is encoded to travel on the Network 43 according to the resulting category by looking up applicable rules in an LDAP directory.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a network connected to clients by intermediate nodes, a method of differentiating priority of access to an internet web server based on content of web pages being accessed, comprising the steps of:

storing ratings independent of client input of web pages at a node on the network;

on receipt of a client request for a web page, determining at an intermediate node a rating for said web page, said determination being made by lookup at said rating storage node;

converting, at said intermediate node, said rating to a service class by looking up said rating at an Lightweight Delivery Access Protocol (LDAP) directory node;

selecting, for use of said intermediate node, a mechanism for providing differentiated services according to said service class.

2. The method of claim 1, wherein said rating storage node is a label bureau node.

3. The method of claim 1, wherein said rating storage node is said server.

4. The method of claim 1, wherein said selected mechanism is one or more of:

establishing a queuing priority for said service class;

setting Type of Service (TOS) flags in package headers;

using channels in the network which have been designated for said service class;

passing parameters to the server;

limiting bandwidth used by said service class.

5. The method of claim 1, wherein a client-side intermediate node determines said rating and sends it to a server-side intermediate node, which converts the rating to a service class and then uses said service class to select a mechanism for differentiating services on the network.

6. The method of claim 5, wherein said client-side and said server-side intermediate nodes monitor the network traffic between them, and said client-side intermediate node decides when to activate said selected mechanism.

7. The method of claim 1, wherein a client-side intermediate node determines said rating and converts said rating to a service class and then uses said service class to select a mechanism for differentiating services on the network.

8. The method of claim 7, wherein a server-side intermediate node receives said service class from a client-side intermediate node and overrides said service class determination by converting said rating to another service class and then uses said service class to select another mechanism for differentiating services on the network.

9. In a network connected to clients by intermediate nodes, a system for differentiating priority of access to an internet web server based on content of web pages being accessed, comprising:

means for storing ratings independent of client input of web pages at a node on the network;

on receipt of a client request for a web page, means for determining at an intermediate node a rating for said web page, said determination being made by lookup at said rating storage node;

means for converting, at said intermediate node, said rating to a service class by looking up said rating at a Lightweight Delivery Access Protocol (LDAP) directory node;

means for selecting, for use of said intermediate node, a mechanism for providing differentiated services according to said service.

10. The system of claim 9, wherein said rating storage node is a label bureau node.

11. The system of claim 9, wherein said rating storage node is said server.

12. The system of claim 9, wherein said selected mechanism is one or more of:

means for establishing a queuing priority for said service class;

means for setting Type of Service (TOS) flags in package headers;

means for using channels in the network which have been designated for said service class;

means for passing parameters to the server;

means for limiting bandwidth used by said service class.

13. The system of claim 9, wherein a client-side intermediate node determines said rating and sends it to a server-side intermediate node, which converts the rating to a service class and then uses said service class to select a mechanism for differentiating services on the network.

14. The system of claim 13, wherein said client-side and said server-side intermediate nodes monitor the network traffic between them, and said client-side intermediate node decides when to activate said selected mechanism.

15. The system of claim 9, wherein a client-side intermediate node determines said rating and converts said rating to a service class and then uses said service class to select a mechanism for differentiating services on the network.

16. The system of claim 15, wherein a server-side intermediate node receives said service class from a client-side intermediate node and overrides said service class determination by converting said rating to another service class and then uses said service class to select another mechanism for differentiating services on the network.

* * * * *